(12) United States Patent
Claridge Huggins

(10) Patent No.: US 9,718,220 B1
(45) Date of Patent: Aug. 1, 2017

(54) FOAM FORM FOR CASTING WOOD FIRED OVEN

(71) Applicant: Catherine Claridge Huggins, Bellingham, WA (US)

(72) Inventor: Catherine Claridge Huggins, Bellingham, WA (US)

(*) Notice: Subject to any disclaimer, the term of this patent is extended or adjusted under 35 U.S.C. 154(b) by 701 days.

(21) Appl. No.: 14/137,050

(22) Filed: Dec. 20, 2013

Related U.S. Application Data

(63) Continuation-in-part of application No. 13/862,069, filed on Apr. 12, 2013.

(60) Provisional application No. 61/739,853, filed on Dec. 20, 2012, provisional application No. 61/635,515, filed on Apr. 19, 2012.

(51) Int. Cl.
*B29C 39/26* (2006.01)

(52) U.S. Cl.
CPC .................................. *B29C 39/26* (2013.01)

(58) Field of Classification Search
USPC ............................................................ 264/39
See application file for complete search history.

(56) References Cited

U.S. PATENT DOCUMENTS

| | | | |
|---|---|---|---|
| 5,902,528 A * | 5/1999 | Spragg | ..................... B28B 1/44 249/144 |
| 2008/0092775 A1* | 4/2008 | Strauss | ................... B28B 7/346 106/38.35 |

\* cited by examiner

*Primary Examiner* — Jacob Thomas Minskey
(74) *Attorney, Agent, or Firm* — Paul B. Heynssens Attorney at Law PLC

(57) ABSTRACT

A masonry oven constructed with the aid of molds. An exemplary foam mold set to produce assembly pieces on site for the construction of a pizza oven. The mold set allows do-it-yourself homeowners, construction companies and the like to construct a custom pizza oven by simply pouring high-temp concrete into various molds and assembling and finishing the assembled oven core.

4 Claims, 27 Drawing Sheets

Mortar Applied to Ledges and
Side Panel Ledges Prior to
Placing Top Panels
1202

200

Mortar Applied to Ledges and
Side Panel Ledges Prior to
Placing Top Panels
1202

All Precast Panels in Place and
Final Fit Adjustment
1302

Placement of Chimney And
Final Application Of Mortar To
Exterior Joints
1502

Instillation of Insulation Blanket
Over The Oven Core
1602

Trimming of Insulation Blanket
Over The Oven Core
1702

Instillation of Wire Net
1902

Cutting Tool
2006

Trimming of Wire Net Around
Door
2004

Application of Stucco Over Wire
Netting
2102

FOAM FORM FOR CASTING WOOD FIRED OVEN

CROSS-REFERENCE TO RELATED APPLICATIONS

This is a continuation-in-part of application Ser. No. 13/862,069, filed Apr. 12, 2013, which claims benefit to provisional patent application 61/635,515 filed Apr. 19, 2012, the disclosure of which is incorporated herein by reference. This application also claims the benefit of U.S. Provisional Patent Application No. 61/739,853 filed Dec. 20, 2012, the contents of which are hereby incorporated by reference.

TECHNICAL FIELD

This description relates generally to masonry construction and more specifically to construction of masonry ovens for consumer use.

BACKGROUND

A masonry oven, also known as a brick or stone oven, is an oven including a baking chamber in which a fire is lit. Though traditionally wood-fired, coal-fired, natural gas fired or even electricity fired ovens are possible. Modern masonry ovens are often associated with artisanal bread and pizza, but in the past they were used for any cooking task involving baking. These ovens are often built by a skilled mason and therefore typically expensive to the point where people usually do not have them in their homes or in an outdoor barbeque area.

FIG. 1 shows a typical oven being hand built from brick. A cement or masonry floor 100 is constructed and each course of brick 102, 104, 106, 108, 110 is laid up and allowed to set sufficiently before the next course is added. Alternatively an oven can be cast from concrete. However, a mold for such a casting is often constructed on site, and is another costly and time consuming structure to build. The mason maintains the circular shape of this oven with a compass like device 112, which similar to a plumb line for vertical surfaces, allows the mason to maintain the shape of each course as a circle and each course being in reduced diameter to form a dome. Needless to say such a brick by brick process is expensive and time consuming to construct. And if not done by a skilled mason the result can be an oven that does not heat properly, and that may be less than pleasing to look at.

The direct-fired masonry oven is often called a "Roman" or "black" oven, because of its origin. It is called a black oven because the smoke from the wood used as fuel sometimes collects as soot on the roof of the oven. As previously stated masonry ovens are not easy to construct, however the ovens were in wide use throughout medieval Europe and were often built to serve entire communities, where the owners or local governments that built them might charge a fee for their use. Such ovens are still in wide use in artisanal bakeries and pizzerias. Also, in the pre-Columbian Americas, similar ovens, called by the Spanish term hornos, were often made of clay or adobe. This construction technique has been used since antiquity, and does an excellent job of baking various items. However modern technology has provided a somewhat satisfactory solution to building a custom built masonry oven.

FIG. 2 shows an table top pizza oven 200 constructed of metal and other modern materials. Such ovens are used in commercial settings, but tend to be expensive, aesthetically unappealing, and they do not store and radiate heat like a masonry oven. However, such an oven may be somewhat light weight, and easy to ship and install. But, many people still prefer bread and pizza that has been cooked in a masonry oven, and may find the modern metal oven a poor substitute for the masonry oven.

People are unable to easily, and economically create a pizza oven out of cast high temperature concrete. Prefabricated ovens, often shipped in pieces, are heavy to ship and expensive. It would be advantageous for a homeowner or consumer to be able to build a cast pizza oven with a onetime use mold or molds, with far less cost (Do-it-yourself vs. a machine made oven) than a custom built oven to carry out artisan baking in their home or yard. In particular a mold set that is cost effective to ship that allows pieces of an oven core assembly to be assembled on site allows easy oven construction without having to deal with the weight of a single cast piece at the job site.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A masonry oven constructed with the aid of molds. An exemplary foam mold set to produce assembly pieces on site for the construction of a pizza oven. The mold set allows do-it-yourself homeowners, construction companies and the like to construct a custom pizza oven by simply pouring high-temp concrete into various molds and assembling and finishing the assembled oven core.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 23 is a front perspective exploded view of a pizza oven core.

FIG. 24 is a front perspective view of a pizza oven core.

FIG. 25 is a rear perspective view of a pizza oven core.

FIG. 26 is a top view of a pizza oven core.

FIG. 27 is a right view of a pizza oven core.

FIG. 28 is a bottom view of a pizza oven core

FIG. 29 is a left view of a pizza oven core.

FIG. 30 is a rear view of a pizza oven core.

FIG. 31 is a front view of a pizza oven core.

FIG. 32 is a front perspective view of a finished pizza oven utilizing the previously described pizza oven core.

FIG. 33 is a rear perspective view of a finished pizza oven utilizing the previously described pizza oven core.

FIG. 34 is a right view of a finished pizza oven utilizing the previously described pizza oven core.

FIG. 35 is a left view of a finished pizza oven utilizing the previously described pizza oven core.

FIG. 36 is a front view of a finished pizza oven utilizing the previously described pizza oven core FIG. 37 is a rear view of a finished pizza oven utilizing the previously described pizza oven core.

FIG. 38 is a bottom view of a finished pizza oven utilizing the previously described pizza oven core.

FIG. 39 is a top view of a finished pizza oven utilizing the previously described pizza oven core.

Like reference numerals are used to designate like parts in the accompanying drawings.

DETAILED DESCRIPTION

Figure 1:
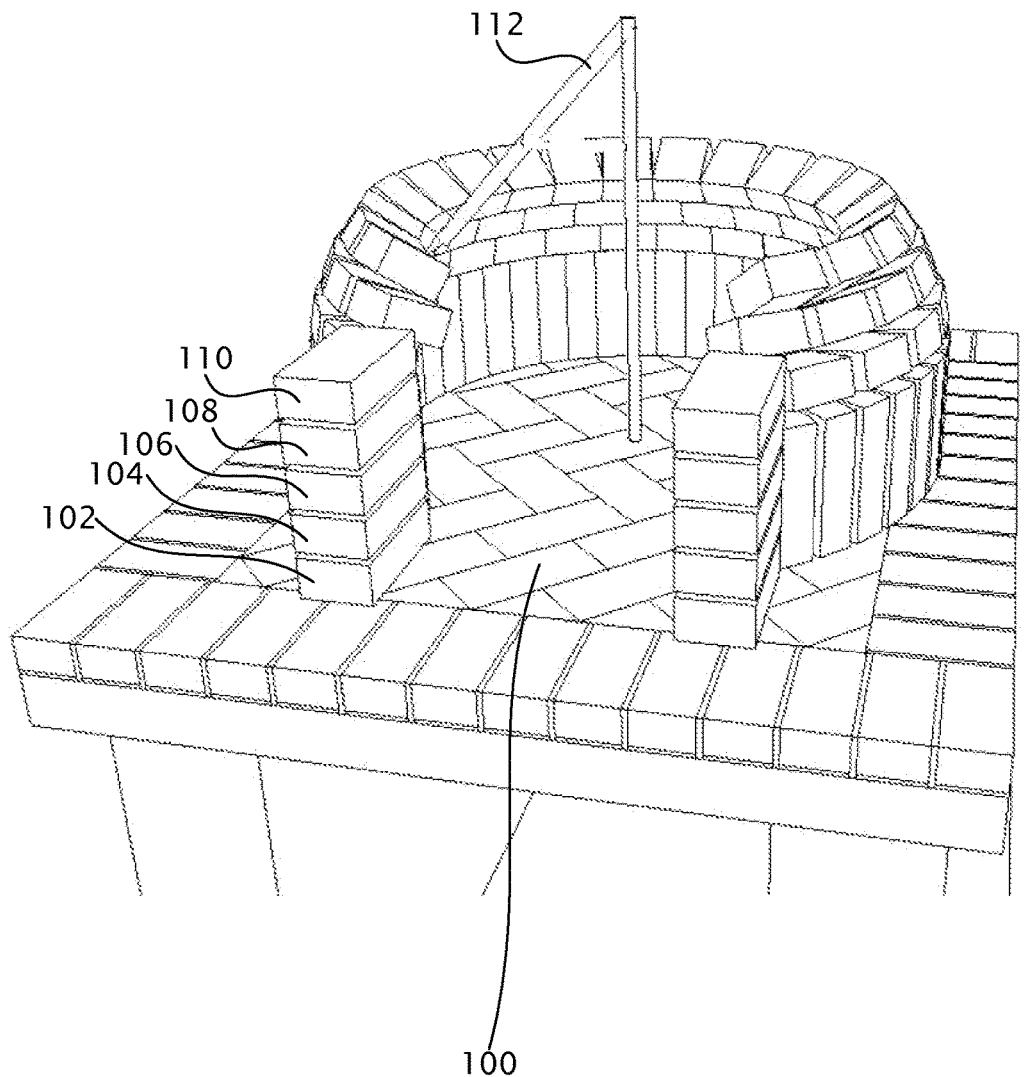
FIG. 1 shows an oven being built from brick.
Figure 2:
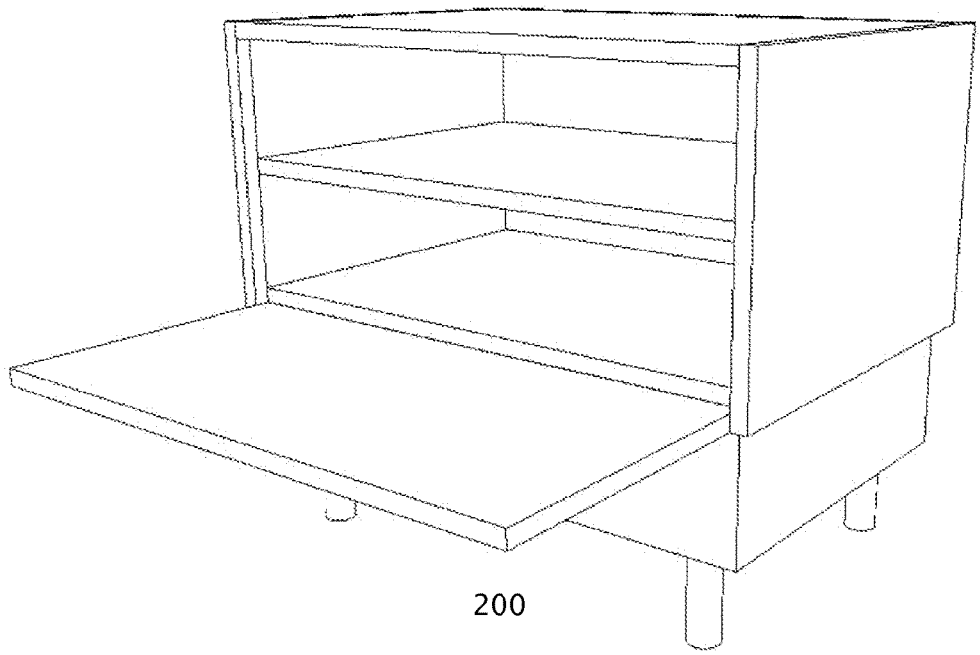
FIG. 2 shows an table top pizza oven constructed of metal and other modern materials.

The detailed description provided below in connection with the appended drawings is intended as a description of the present examples of a masonry (or equivalently "pizza" oven) and is not intended to represent the only forms in which the present example of a self-cast masonry oven may be constructed or utilized. The description sets forth the functions of the example and the sequence of steps for constructing and operating the example. However, the same or equivalent functions and sequences may be accomplished by different examples. Dimensions may be shown in some drawings, the dimensions shown are only exemplary and not intended to be limiting, as the oven may be scaled, up or down as desired. The proportions are also but exemplary, as other proportions of one component or element may be varied while still maintaining the overall function of the oven for artisan baking.

The problem this invention solves is the ability to have a pizza oven without the high cost, high shipping cost and typically massive manpower needed to enjoy a pizza oven. This examples described herein gives virtually anyone the ability to make a pizza oven out of a high-temperature concrete. On site the user pours a conventional high temperature concrete mix into the molds to construct the pieces. After the molds are full of concrete they will harden for several days. Then the foam molds can simply be torn off and the cast pieces of a pizza oven will remain for on-site assembly and finishing. After building the proper pizza oven base or pedestal for support, the user simply assembles the site molded pieces on top of the cooking surface (which is the top surface of the pedestal).

As previously described, people are generally unable to easily create a pizza oven out of brick or cast high temperature concrete. Prefabricated ovens are heavy to ship and expensive. This system creates ovens that look and function like a hand crafted brick-by-brick built oven, but on a onetime use platform resulting in far less cost to produce an aesthetically pleasing and functional oven capable of performing artisan baking at home. The molds described herein allows do-it-yourself homeowners the ability to make a pizza oven in their own backyard (or wherever) by simply pouring high-temp concrete into molds as part of the fabrication process described herein.

The examples below describe a cast concrete pizza oven assembled from pieces cast on site. Although the present examples are described and illustrated herein as being implemented in a pizza oven, the system described is provided as an example and not a limitation. As those skilled in the art will appreciate, the present examples are suitable for application in a variety of different types of oven or baking systems such as for baking artisan breads and other dishes.

Wood-fired pizza ovens such as the examples described herein, use wood fuel for cooking. There are typically two types of wood-fired pizza ovens that the molded oven described herein could be applied to, "black ovens" and "white ovens". The process and mold described herein may advantageously be used in the construction of either type of oven. And in addition a variety of oven shapes may be created with various mold designs, that may be used to produce an oven by the methods described herein.

Black ovens are heated by burning wood in the same chamber and the food is cooked alongside the fire, while it is still going. Or the food is cooked in the heated chamber after the fire and coals have been swept out. A black oven is typically heated just once by burning wood inside the oven chamber. After the coals are raked out, the oven cools over a period of hours. Immediately after a firing, the oven temperature may exceed 1000 degrees Fahrenheit. The mass of the oven acts as a 'thermal reservoir, which slowly releases heat over time. The retained heat in the oven may be used to cook multiple batches of bread, or alternatively, foods requiring different temperatures can be cooked in succession as the temperature of the oven slowly drops. This practice maximizes the efficiency of the oven, by fully utilizing the thermal energy stored during the firing process.

White ovens may be heated by heat transfer from a separate combustion chamber and flue-gas path. The cooking chamber of the oven remains "white", or clean from ash. The "white oven" is a somewhat more complex design that pipes heat in from an external firebox without routing the smoke from the fire through the oven.

Hybrid oven designs may combine aspects of both internal and external-fired oven models. The molds and the method of construction described herein may be advantageously applied in the construction of black, white, and hybrid ovens.

Generally, a pizza oven is roughly dome or barrel-shaped on the interior (and sometimes on the exterior as well), with the ceiling of the oven constructed as an arch over the baking surface. The exterior may take a variety of shapes 300, 302, 304, 306, according to the design of the mold. The exterior allows any decorative shape to be provided as a support base for decorative masonry or stone work. The front entrance 318 may be approximately 63% the height of the top of the oven ceiling. If the entrance is too high and heat escapes and is lost, if too low and the oven does not heat completely. Accordingly a molded and assembled oven core 320 allows the opening 318 dimensions to be set in the desired proportions, producing an oven that heats efficiently. A chimney 316 is provided in a set place to help with draft, and an aperture in the assembly provides easy installation of the chimney during construction. The unitary molded construction provides a solid oven very similar to a custom built solid brick oven.

Such large pieces forming a core 320 would be difficult and expensive to ship, and if built on site a mason would most likely be required to achieve the result shown-possibly by utilizing an on-site custom built mold from wood or the like. Accordingly, most people are unable to easily create a pizza oven out of cast high temperature concrete. The invention herein solves this problem.

Figure 3:
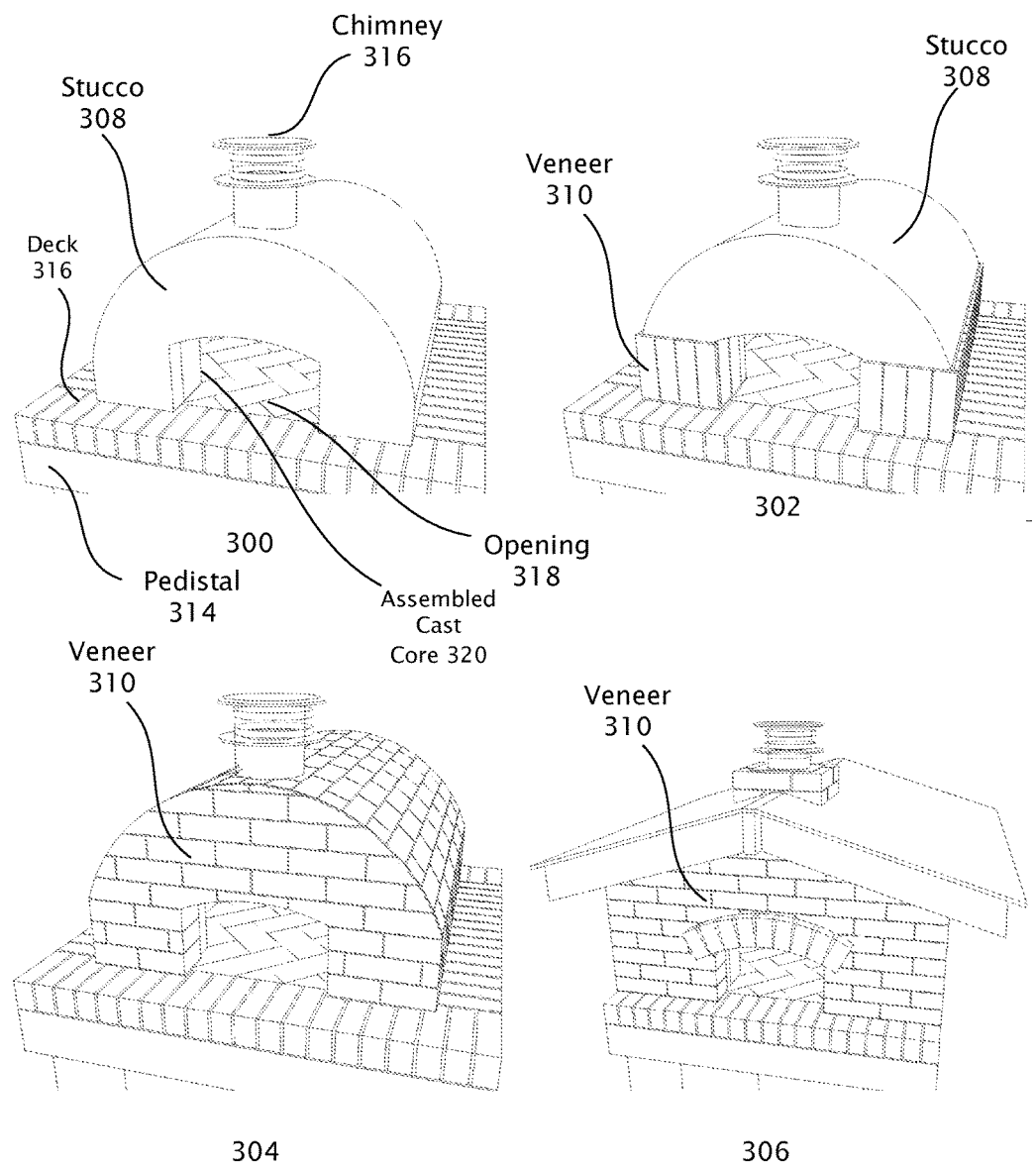
FIG. 3 is a pictorial diagram of a wood fired pizza oven built using the mold and construction process described herein.

FIG. 3 is a pictorial diagram of a wood fired pizza ovens built using the molds and construction process described herein. The most basic finished oven 300 is one in which a simple stucco 308 covering has been applied to the assembled oven core (not shown). However, the oven core described herein allows various exemplary exterior styles 302, 304, 306 to be constructed. Other equivalent finishes are possible depending upon taste and the imagination of the homeowner. In particular veneer material such as stone brick or the like 310 may be applied to cover the oven core, either partially covering the core with stucco 308 covering the remainder of the core 302. Or veneer material may completely cover the oven core 304. And as a final example the core may be disposed inside a structure, such as a fireplace or other fanciful structure 306.

The oven core 300 may be built on top of a masonry (or other suitable material) pedestal 306. The core is cast then assembled in place substantially on the pedestal 314, where thermal blanketing (not shown) may be applied over the core, and a decorative facing 308, 310 may be applied. For additional ornamentation the exterior of the oven may have a suitable brick veneer, stone veneer or the like applied to produce virtually any decorative appearance. The chimney 316 may be made from sheet metal or the like. Also the chimney 316 may be covered with a masonry or stone veneer as well to achieve a desired appearance. The opening 318 is where wood and food enters the oven interior where a portion of the assembled cast core 320 may be seen. The cast core is visually exposed in the interior of the oven.

Masonry ovens may have a concrete deck 316 or base inside the oven, that may be concrete fire brick or any other material desired that tends to hold and radiate heat.

The masonry oven described herein, due to its on-site cast construction advantageously traps and radiates heat from a fire, either built within the oven itself or in a firebox in the same way that a custom built unitary masonry oven does, giving cooking results on par with ovens found in shops and bakeries. In addition the mold and the construction process tends to make it easy for an untrained home owner, or do-it-yourselfer to construct a pizza oven that looks like a professional mason constructed it, at the fraction of the cost of a custom built oven.

Masonry ovens may be built with fire-resistant materials like firebrick or clay, or even directly cast from refractory cement. Those designed for bread use are generally quite heavily built to store several hours' worth of heat after completely burning a load of wood, while those designed for pizza or other live-fire cooking techniques can have thinner construction. The molds described herein may similarly be provided in thick and thin walled versions if desired.

Figure 4:
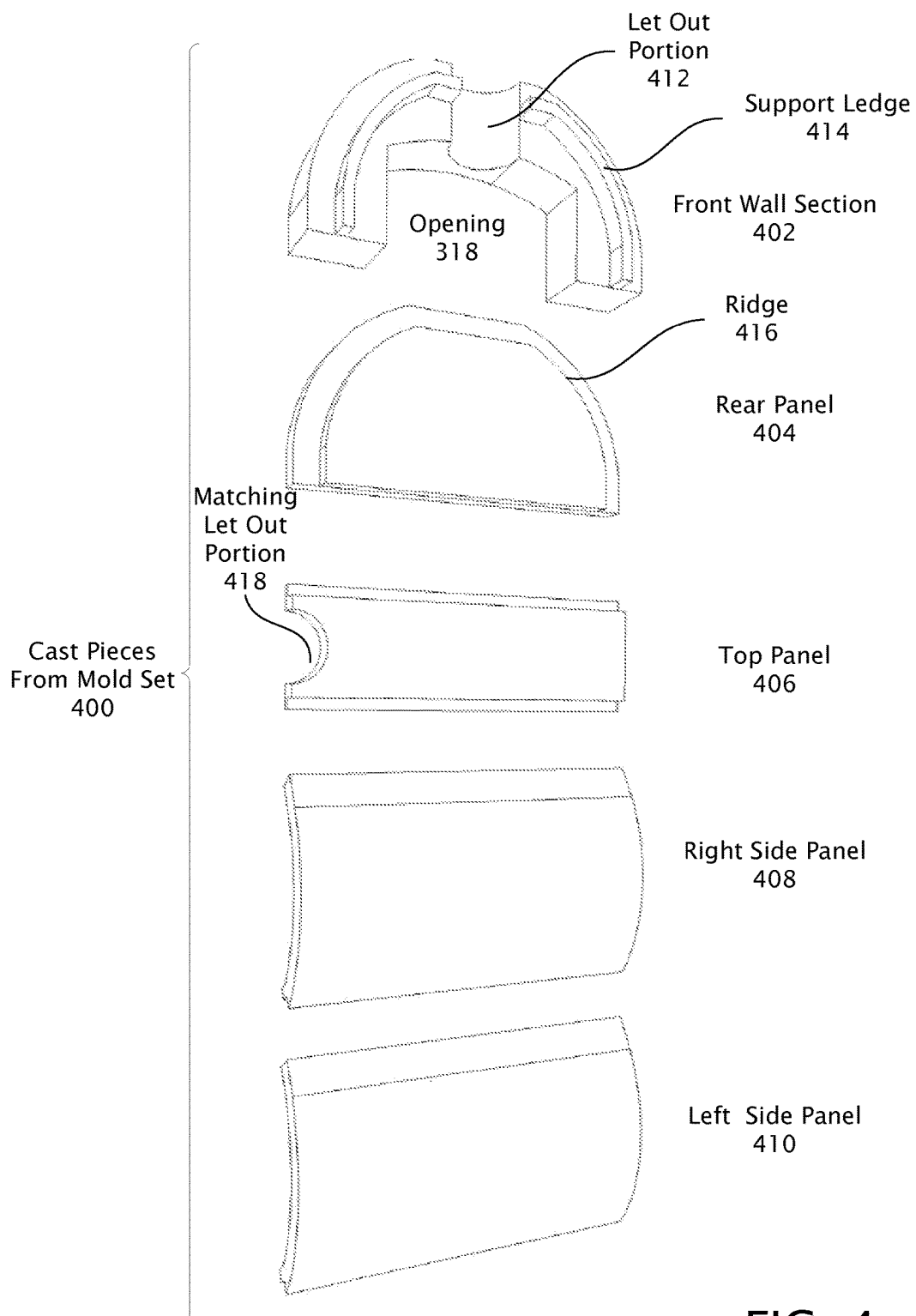
FIG. 4 is a pictorial diagram of the oven castings produced from the mold described herein.

FIG. 4 is a pictorial diagram of the oven castings 400 produced from the mold described herein. The mold set produces pieces 400 that are of a convenient size to move, so that the weight is substantially reduced from that of a single unitary casting.

The front wall (or panel) section 402 includes a let out portion for the chimney 412, and the opening 318. Also included is a semicircular support ridge, or shelf 414, for supporting the various panels 406, 408, 410 after assembly.

The rear panel 404 is typically of unitary construction. This panel 404 also includes a semicircular support ridge 416 (substantially matching the dimensions of opposing ridge 414) for supporting the various panels 406, 408, 410 after assembly. Front panel 402, and rear panel 404 together form a support structure for supporting the various panels 406, 408, 410.

Top panel 406 is typically disposed in the final assembly last. This panel also includes a let out portion 418 that is provided as part of the chimney opening when placed opposite to let out portion 412.

Figure 5:
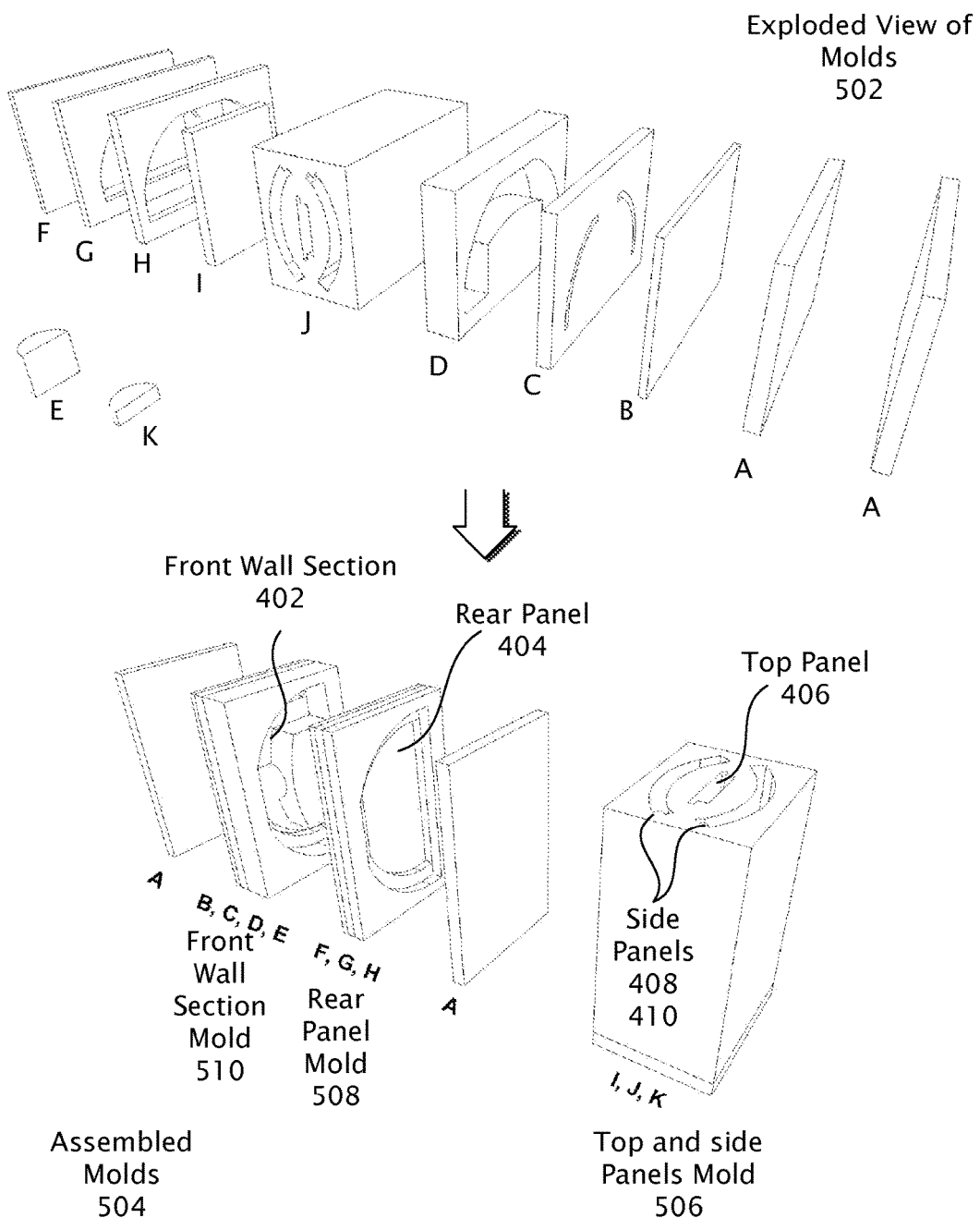
FIG. 5 shows the mold assembly.

Right side panel 408 and left side panel 410 set the length of the oven assembly, and also support the top panel 406. As shown in the figures the top panel 406, and side panels 408, 410 include edges having reduced thickness, so that when assembled the overall assembly will have a smooth appearance while providing support to an adjacent piece. The top panel 406, and side panels 408, 410 also include curvature sufficient to produce a half cylinder shape when assembled FIG. 5 shows the mold assembly. The foam oven mold assembly 500 may be advantageously constructed from readily available closed cell foam panels. The user may buy the oven mold set so constructed and easily have it shipped to the job site, as the foam is lightweight and easy to transport. Other than providing a base, no special set up, fixtures, jigs, custom molds, specialized masonry tools or the like are needed to construct the oven.

As shown in the exploded view 502 suitable shapes may be cut into the panels, and they may then be assembled 504 into the appropriate molds for casting the various oven assembly pieces (400 of FIG. 4). In this particular example when parts A-H are placed together in a box, it has the same size as the box containing parts I-K. Advantageously two identical shipping containers may be used in this example.

Component A. This panel is used in the construction of the base (used to form the Vermiculte base). It is not part of the oven core design. It is included in the kit to: 1. Fill the gaps in the cardboard box so the kit can be put in the same size boxes (2 boxes per kit), 2. Be used in the construction of the base-it assists the user so they don't have to buy this foam at a hardware store.

Assembly of B, C, D, and E forms the front wall section mold 510 that allows casting of the front wall section 402. Component B is a substantially solid panel typically 1" thick. It is glued to the back of panel C. Component C is the flange panel. It is glued to the back of panel D. When filled with refractory and cured, it creates a substantially hard 1" flange for the sides and top of the oven walls to lean against & lay on (top panel). Component D forms the front of the oven. When filled with castable refractory cement, it creates a solid front wall portion. Component E is a piece of foam that is typically ½ the diameter of the exemplary 6" exhaust. When refractory cement is poured in the mold, (E) keeps a typical 6"×3" shape. When the foam is removed, this section is now the chimney opening.

Assembly of F, G, and H forms the rear panel mold 508, that when filled with mortar forms the rear panel 404. Component F is a solid panel typically 1" thick. It is glued to the back of panel C. Component G is a panel that may be glued to panel G. When filled with refractory cement, this 1" section creates a typically solid, hard 1" flange for the sides and top of the oven walls to lean against & lay on (top panel). It also forms part of the 2.5" back wall. Panel H may be used to form the outside of the back wall.

Assembly of I, J, and K forms the mold for casting the top panel, and the two side panels 506. Panel I may be glued to the flat panel I. Plain panel I acts as the bottom of the mold. Panel J. is the main body. A few days after wet refractory is poured into the mold, the dry panels can removed from the foam mold in the proper shapes for 2 walls and the top ceiling panel. The "L" shape, or notches disposed at the panel edges or ends allow the top ceiling panel to easily sit on the side panels and lock into place. So the top panel sits on 4 flanges—both sides and the front and back panels.

Panel K is the other half of the chimney form. When the refractory cement is poured in on the opposite side of the form, it will land on top of the foam chimney form, but the foam form prevents the refractory from going all the way to the bottom. When the refractory is dry, this small half round piece of foam is removed and the shape it leaves half of the chimney exhaust outlet.

The foam molds may be constructed from preferably closed cell foam. However open cell foam provided with a suitable coating could be used. Foam of high or low density made by any suitable existing foam molding process is suitable. Alternatively the mold components be assembled from individual pieces of foam.

The foam mold 500, when filled with a heat resistant concrete mix, will create the near perfect inside shape for the core or support structure of a pizza oven once the concrete has hardened, the foam is torn away, and the pieces assembled. The example described differs from what currently exists. This invention creates a mold set that homeowners can fill with concrete to create their own oven on site. The molds and the method of oven construction it utilizing the molds replace the high cost of prefabricated pizza oven, the cost of shipping such ovens and the amount of manpower it requires to move the ovens. The examples described herein allow quality ovens to be built individually and on site without requiring a skilled craftsman or mason. The molds and construction system also are very cost effective when compared to mason built ovens. The exemplary mold set allows do-it-yourself homeowners the ability to make a pizza oven in their own backyard {or wherever) by a simplified on site construction the includes pouring high-temp concrete into the exemplary molds and following a process to efficiently install the oven core that has been cast.

Figure 6:
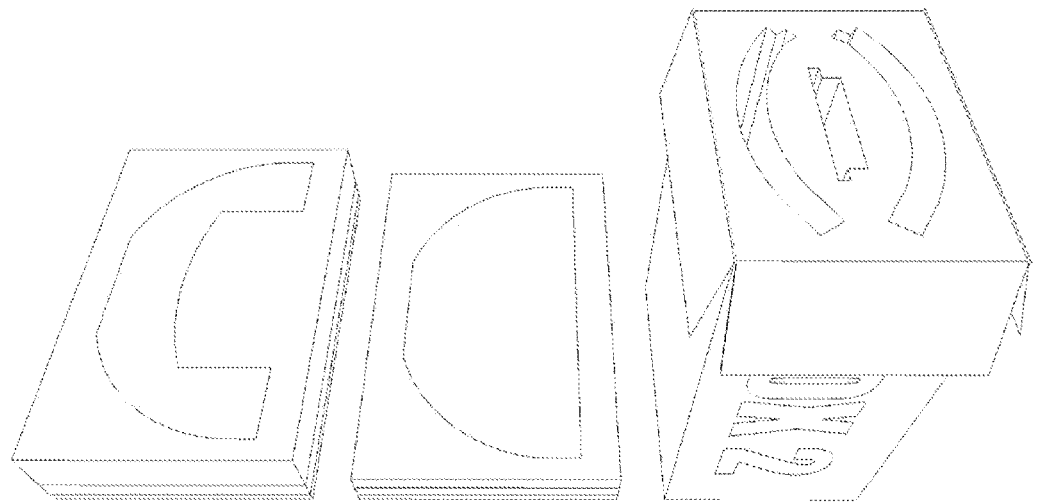
FIG. 6 shows a foam oven mold from the top side in which cement is poured.
Figure 6:
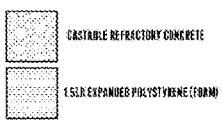
Figure 6:
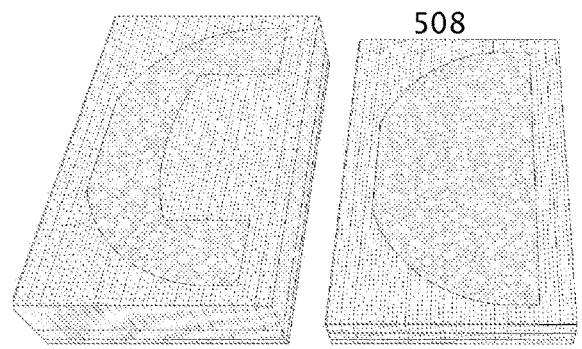
Figure 6:
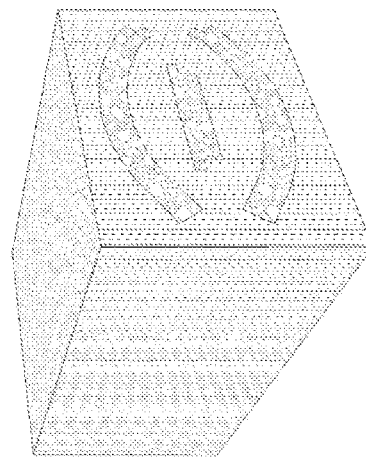

FIG. 6 shows a foam oven mold from the top side in which cement is poured 602. The casting material is typically refractory (high temperature resistant) cement (or its equivalent) with reinforcing material added to prevent cracking.

Typically water may be sprayed on the mold interior prior to adding the cement. However, in alternative examples the spray can be omitted, or optionally the mold may be pre coated with a material to help cement to conform to the mold, aid in release of the mold after hardening, or the like.

The cement may be compacted into the oven mold. Refractory cement, or its equivalent may include strengthening or reinforcing stainless steel fibers (or their equivalent) mixed into the refractory cement. The fibers tend to strengthen or reinforce the cement and may prevent cracks or fissures forming. A tamping tool such as a mallet, stick or the like may be used to distribute the cement and fiber mixture into crevices and corners. The cured cement set in the molds 604 is now ready for removal and assembly onto a previously prepared base or pedestal.

Figure 7:
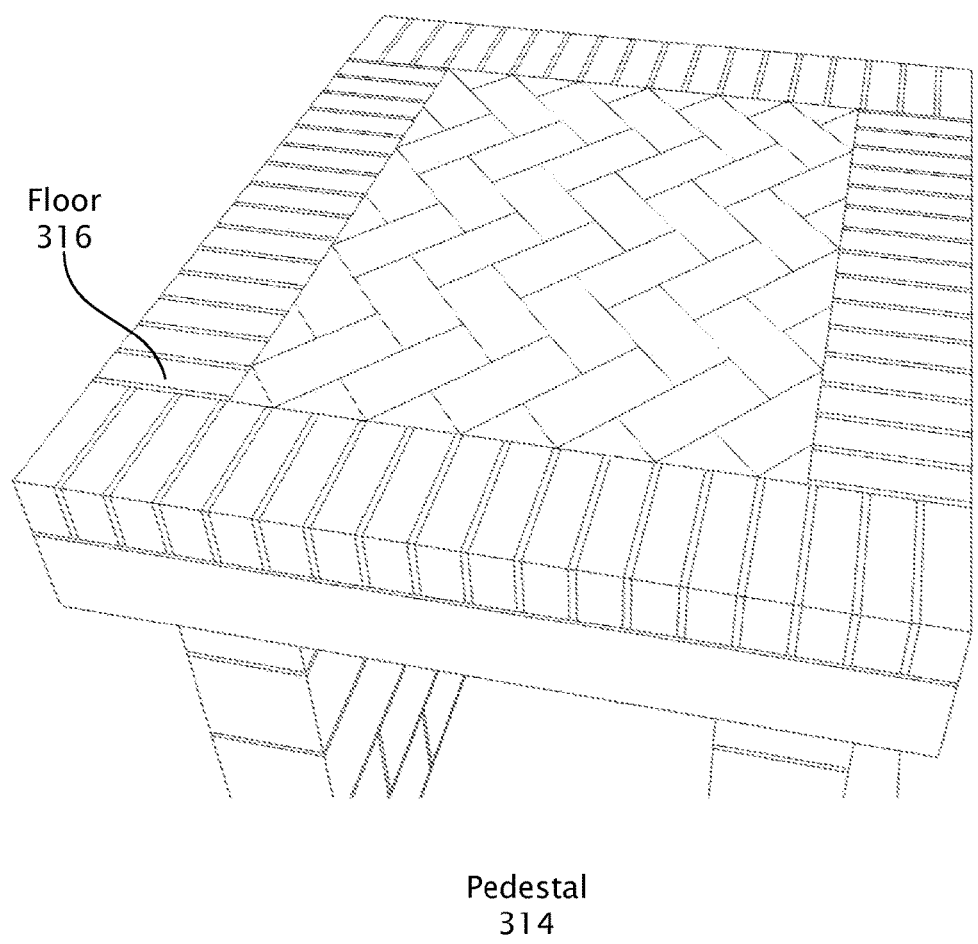
FIG. 7 shows a pedestal upon which the oven castings will be assembled.

FIG. 7 shows a pedestal 314 upon which the oven castings will be assembled. The pedestal may be constructed by any suitable method, as long as a suitable surface for the floor 316 of the oven is provided. The floor may be of cement, brick, a combination of brick and cement, or equivalent materials that function to retain and distribute heat. Preferably a conventionally constructed insulated base may be constructed to keep heat from being drawn away from the oven floor The pedestal may typically be easily constructed by a homeowner, as it typically utilizes vertical, and horizontal surfaces that are easier to construct, than the curved surfaces of the oven core. Alternatively the oven may be disposed on a ground level base, or a counter that may be part of an outdoor kitchen arrangement.

Figure 8:
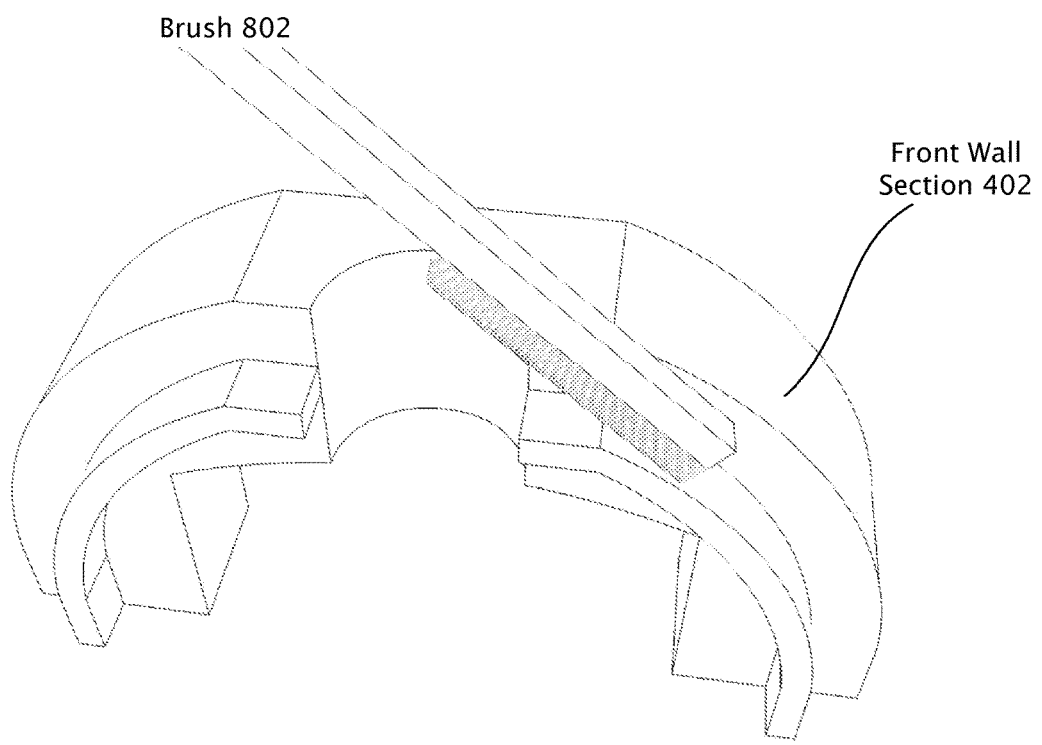
FIG. 8 shows preparation of an exemplary oven piece prior to assembly.

FIG. 8 shows preparation of an exemplary oven piece prior to assembly. To remove remaining foam pieces, and otherwise clean the casting piece 402, a brush 802 or other suitable tool may be used, as after the mold is torn away. Once the various pieces are cleaned up the assembly of the core may begin.

Figure 9:
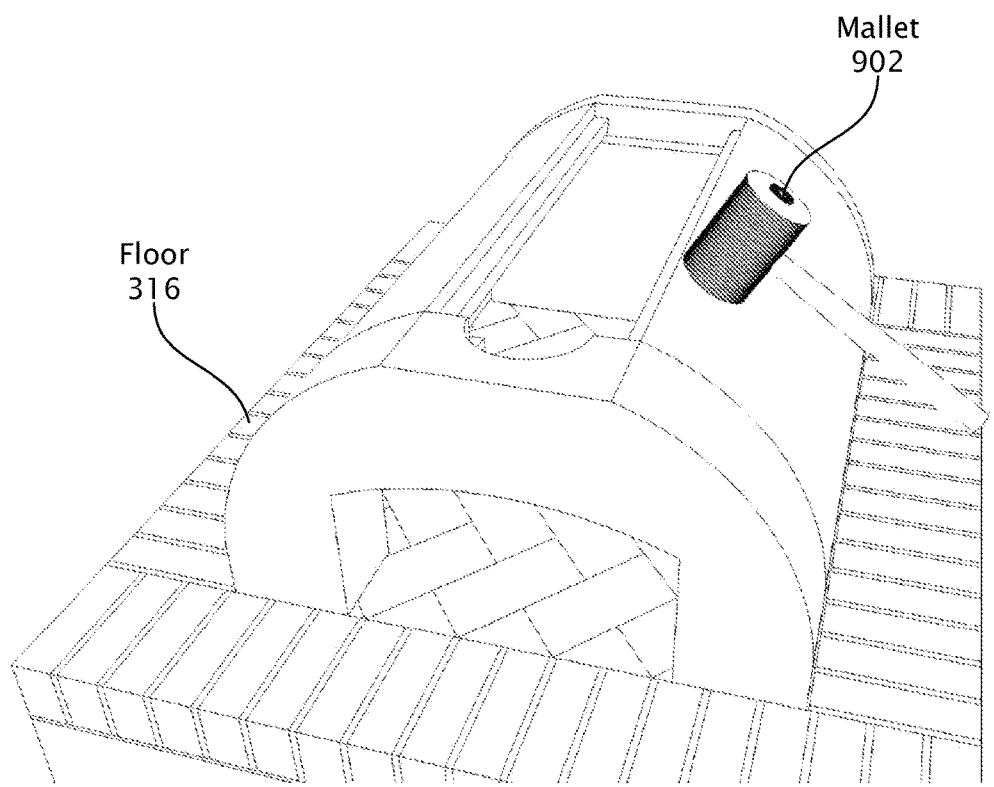
FIG. 9 shows initial placement and positioning of the molded pieces starting with the front wall section on the pedestal.
Figure 10:
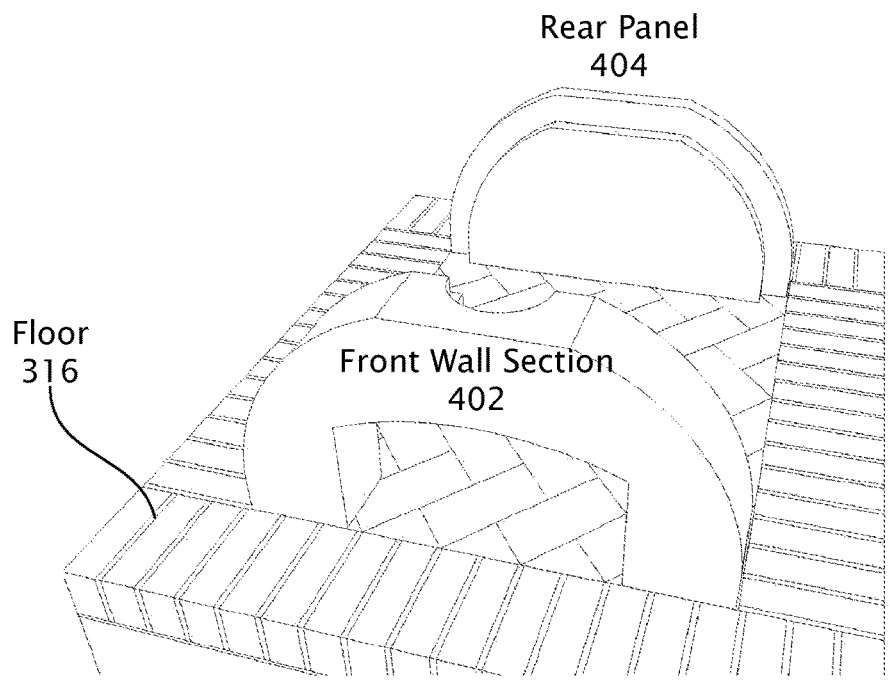
FIG. 10 shows positioning of the front wall section and rear wall section.

FIG. 9 shows initial placement and positioning of the molded pieces 900 starting with the front wall section on the pedestal. Prior to cementing everything in place the on-site molded pieces are assembled on the pedestal to check the fit-starting with the front wall section. A mallet 902 may be needed to nudge the various pieces into place. Once everything is in place the top piece is removed, and the outline of where the pieces contact the base is made on the floor 316 to aid assembly with mortar FIG. 10 shows positioning of the front wall section 402 and rear wall section 404. The front 402 and back 404 sections will typically be cemented into place first on the floor 316. A thin layer of high temperature mortar is applied to the marked areas on the floor where the front and rear panels are placed, and the front and back portions are set in place.

Figure 11:
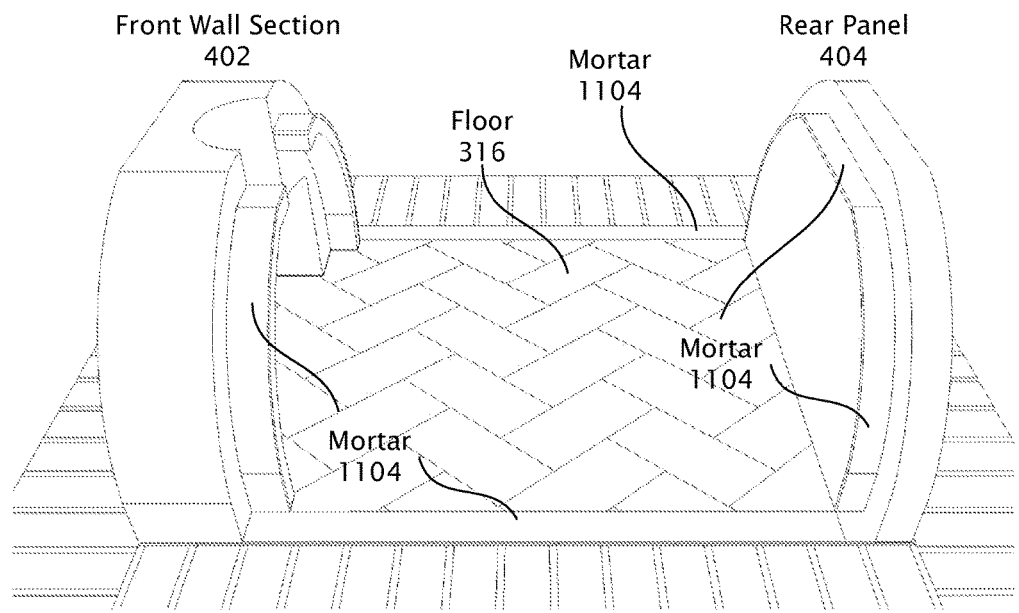
FIG. 11 shows placement of a first side panel relative to the previously disposed front wall section and rear panel.

FIG. 11 shows placement of a first side panel relative to the previously disposed front wall section and rear panel. Next mortar is applied 1104 to the marked areas on the base or floor 316 where the side pieces will contact it. Mortar is also applied 1104 to the ledge portions of the front piece 402 and back piece 404.

Figure 12:
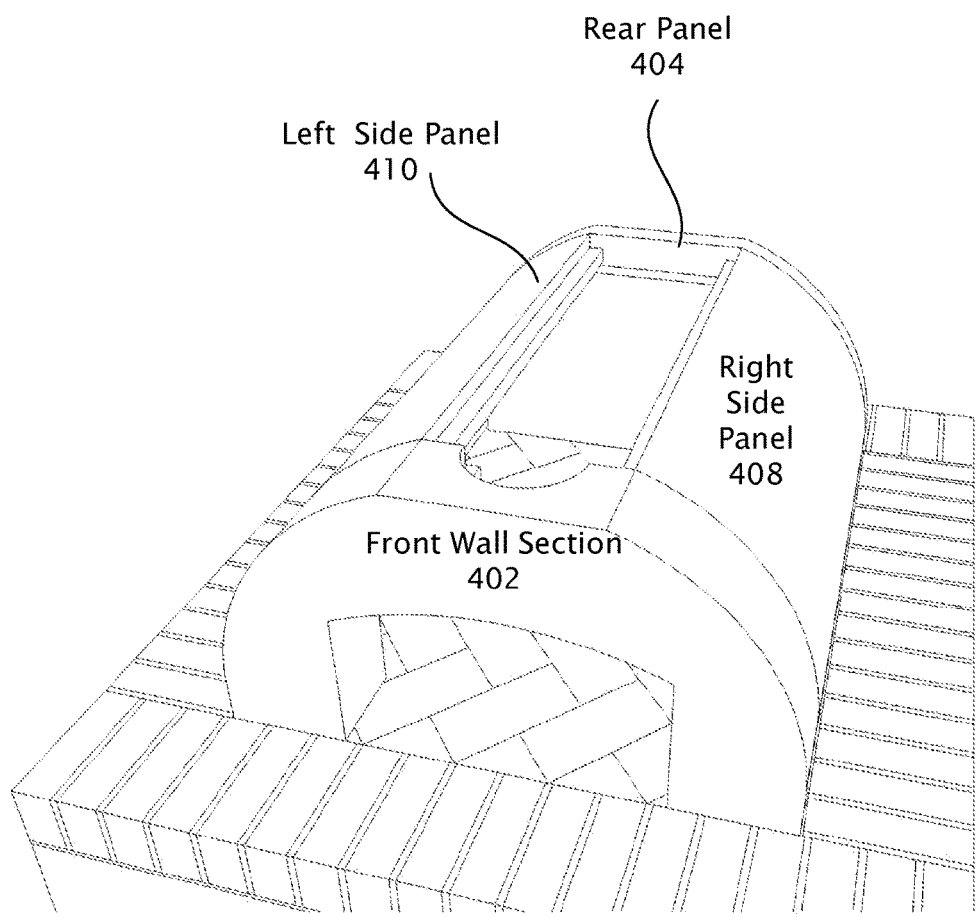
FIG. 12 shows placement of a first or right side panel and a second or left side panel relative to the previously disposed front wall section and rear panel.

FIG. 12 shows placement of a first or right side panel 408 and a second or left side panel 410 relative to the previously disposed front wall section 402 and rear panel 404. The two side pieces 408, 410 are then set in place into the previously applied mortar. Each side piece 408, 410 has a ledge or flange that is now mortared.

Figure 13:
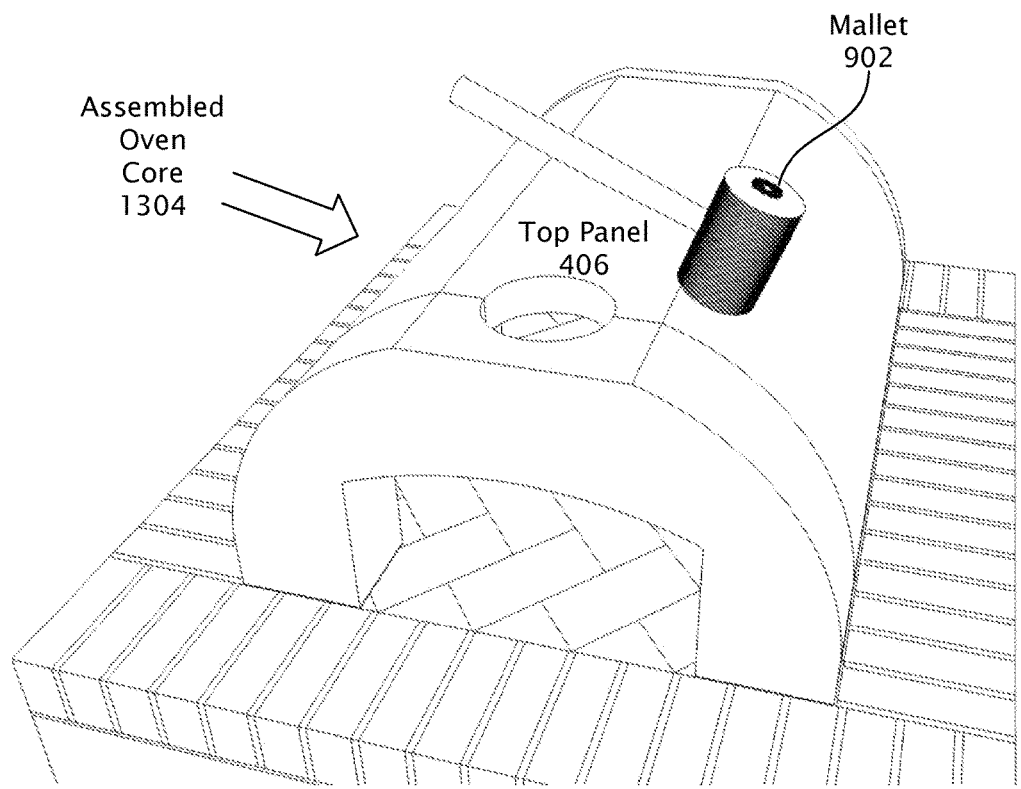
FIG. 13 shows final alignment of the four pieces o form the oven core.

FIG. 13 shows final alignment of the four pieces to form the oven core 1302. The top panel 406 is now placed on the ledges being buttered with mortar, and a mallet 902 is typically used to aid in producing a satisfactorily tight fit. The mortar may then allowed to set, or construction may continue.

Figure 14:
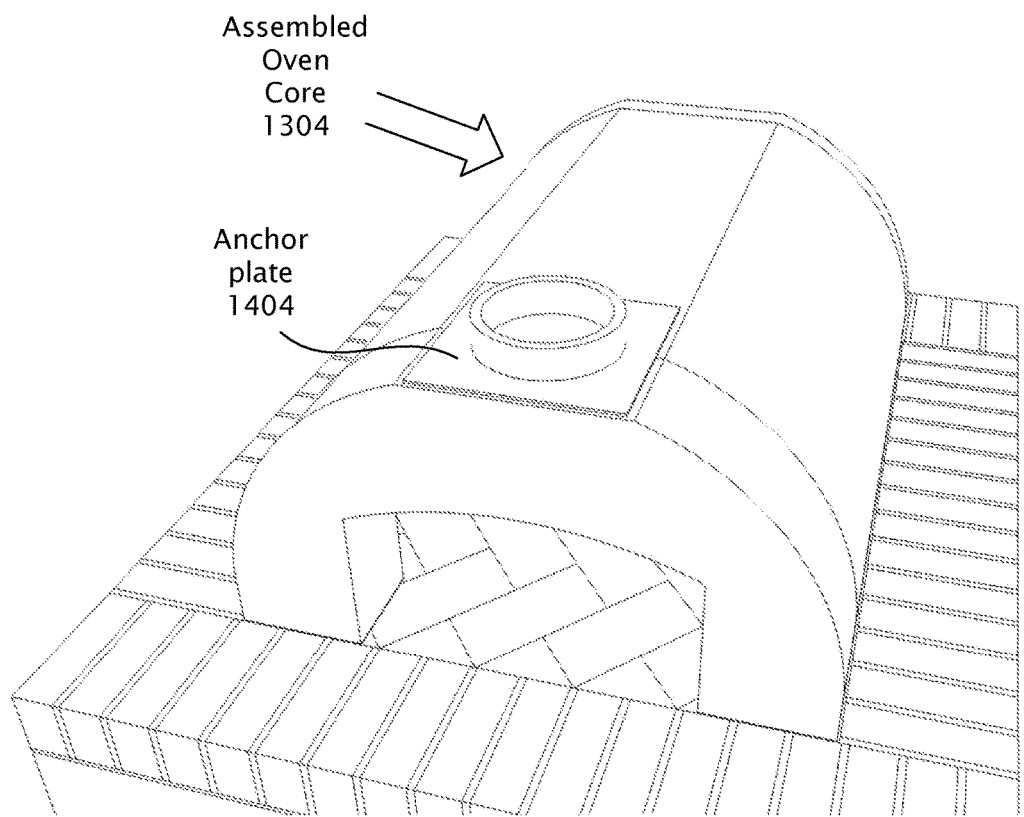
FIG. 14 shows the assembled oven core with the chimney anchor plate disposed on the assembled core.

FIG. 14 shows the assembled oven core with the chimney anchor plate 1404 disposed on the assembled core. High temperature, or heat resistant adhesive, or its equivalent may be used to bond the metal footer or chimney anchor plate over the hole in the assembled oven core.

Figure 15:
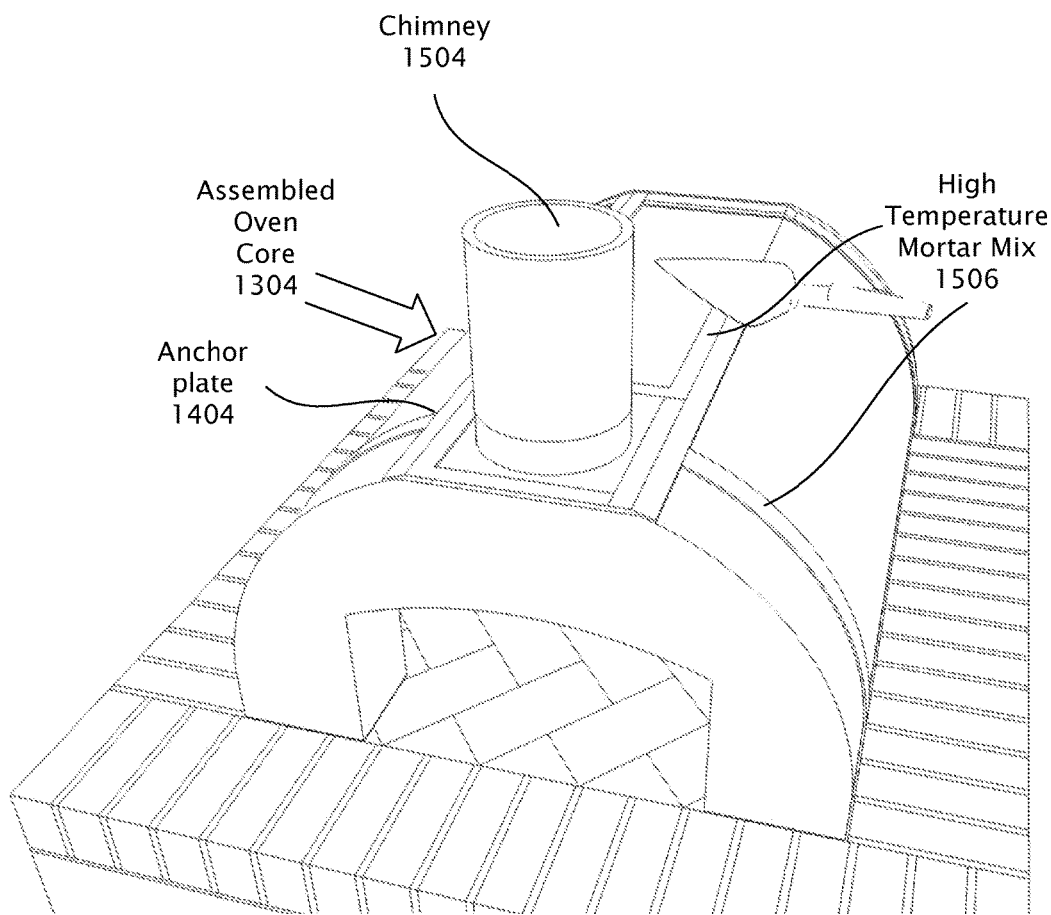
FIG. 15 shows final application of high temperature mortar to the assembled structure.

FIG. 15 shows final application of high temperature mortar 1506 to the assembled structure 1502. A final application of mortar over the joints and on the anchor plate 1404 tends to finally seal the oven assembly 1304. In addition a chimney, or smoke stack 1504 may be coupled to the anchor plate 1404.

Figure 16:
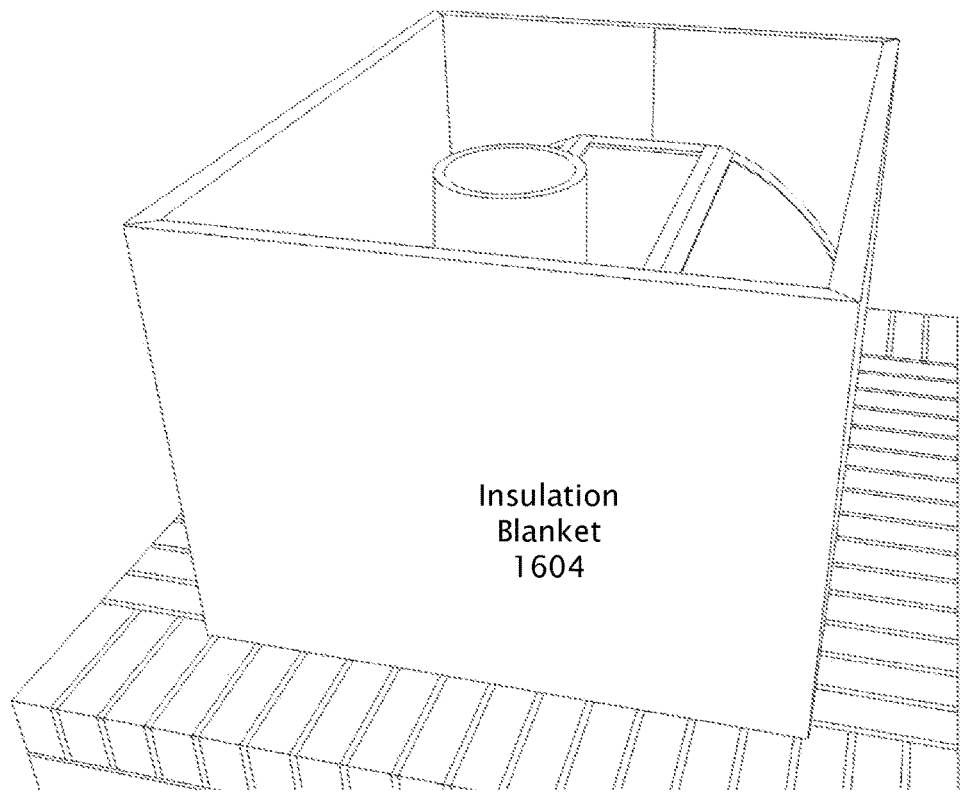
FIG. 16 shows instillation of an insulation blanket over the oven core.

FIG. 16 shows instillation of an insulation blanket 1604 over the oven core. The insulating blanket aids in heat retention, and keeps the exterior of the oven cooler. Conventional one inch (or equivalent) fiberglass batting without a paper backing may be utilized, in one layer to cover the oven. An additional exemplary two additional layers may be disposed to cover the oven-except for the front, where the opening in the core is located. The blanket 1604 is shown in its initial placement prior to fitting to the oven.

Figure 17:
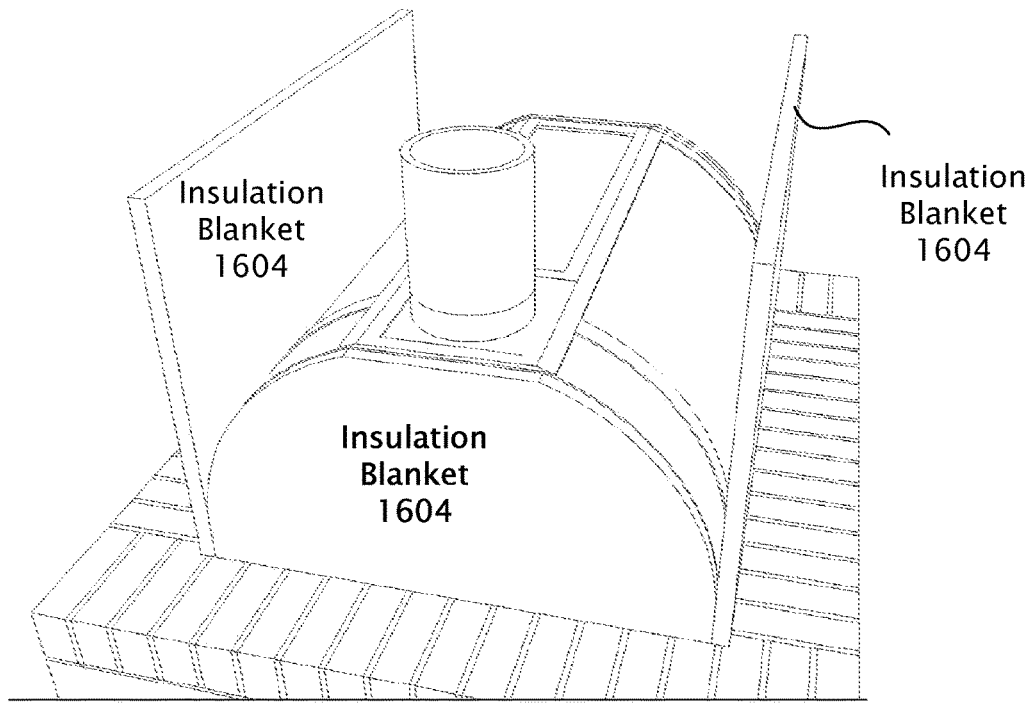
FIG. 17 shows trimming of the insulation blanket to cover the assembled oven core.

FIG. 17 shows trimming of the insulation blanket to cover the assembled oven core 1702. Shears may be used to trim the insulation blanket 1604 so that it fits closely against the assembled oven core. In alternative examples a precut insulation blanket may be used.

Figure 18:
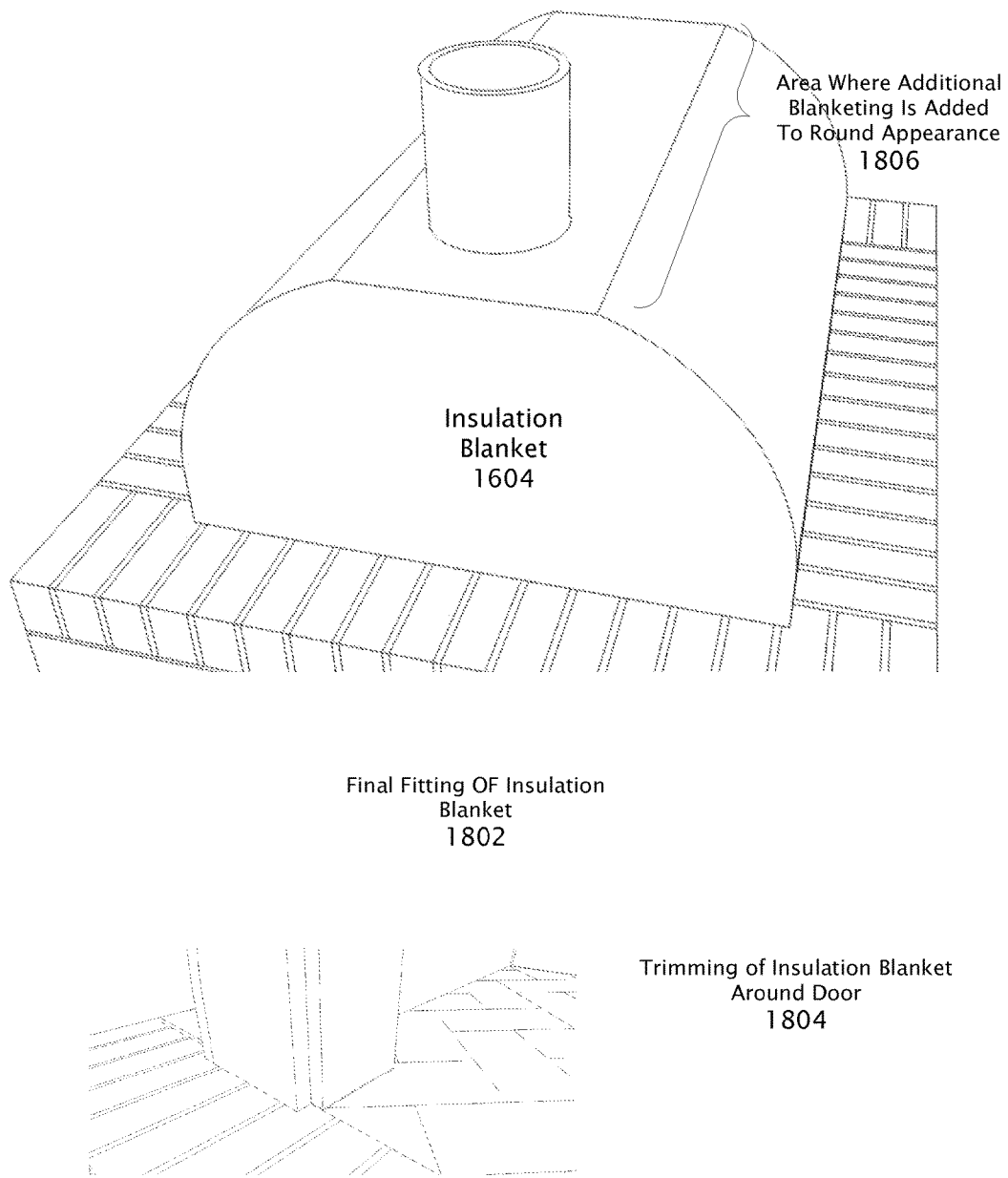
FIG. 18 shows final fitting of the insulation blanket and trimming about the oven door.

FIG. 18 shows final fitting of the insulation blanket and trimming about the oven door 1804. To achieve a more rounded appearance additional blanketing may be placed on top of the oven 1806.

Figure 19:
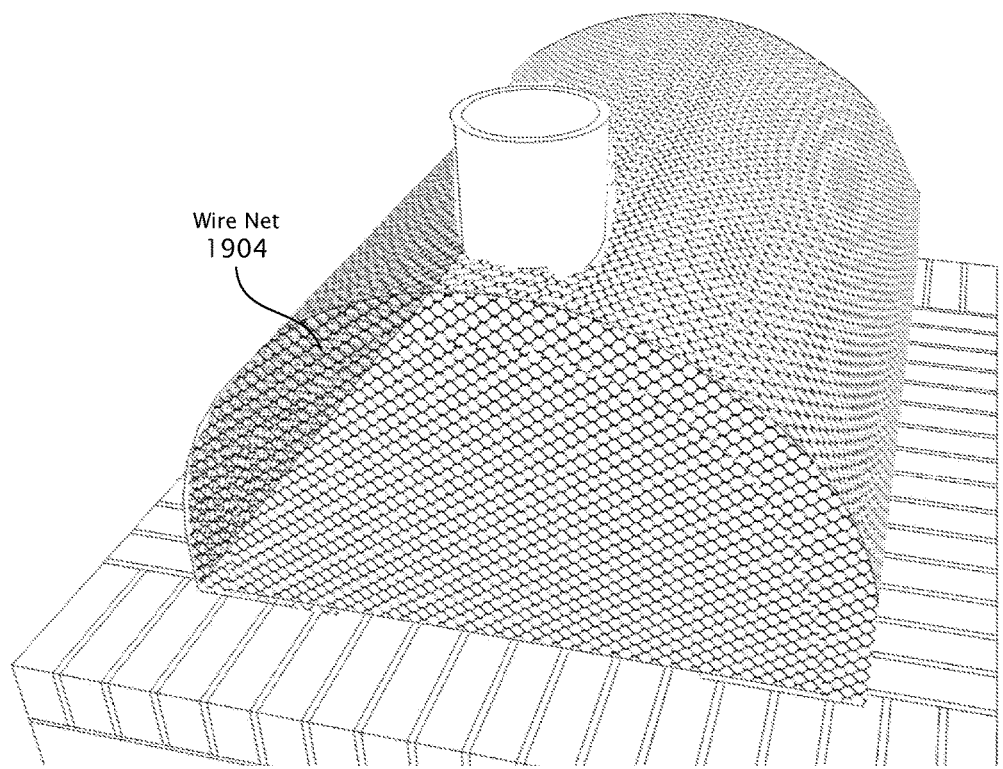
FIG. 19 shows instillation of wire netting over the oven core prior to the application of a masonry covering.

FIG. 19 shows instillation of wire netting over the oven core prior to the application of a masonry covering 1902. The wire net 1904 keeps the insulation in place and provides a support structure for a final masonry coating. The blanket (if not removed previously) and chicken wire may be removed from the oven core opening 308 at this time.

Figure 20:
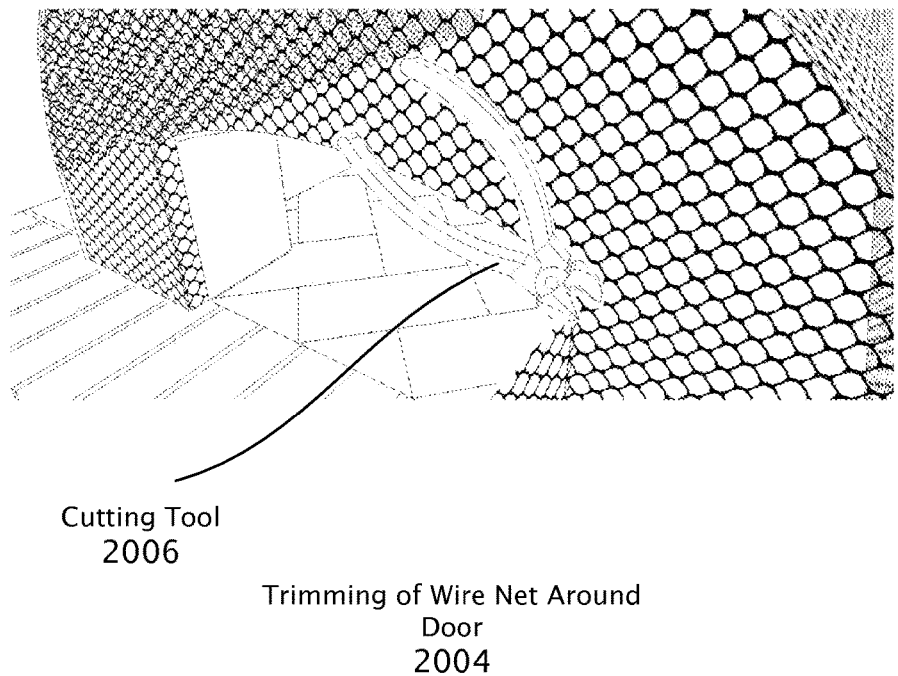
FIG. 20 shows removal of the wire netting from the oven door.

FIG. 20 shows removal of the wire netting from the oven door 2004. The wire is trimmed and folded back to cover the blanket exposed around the opening. Any suitable cutting tool 2006 may be used.

Figure 21:
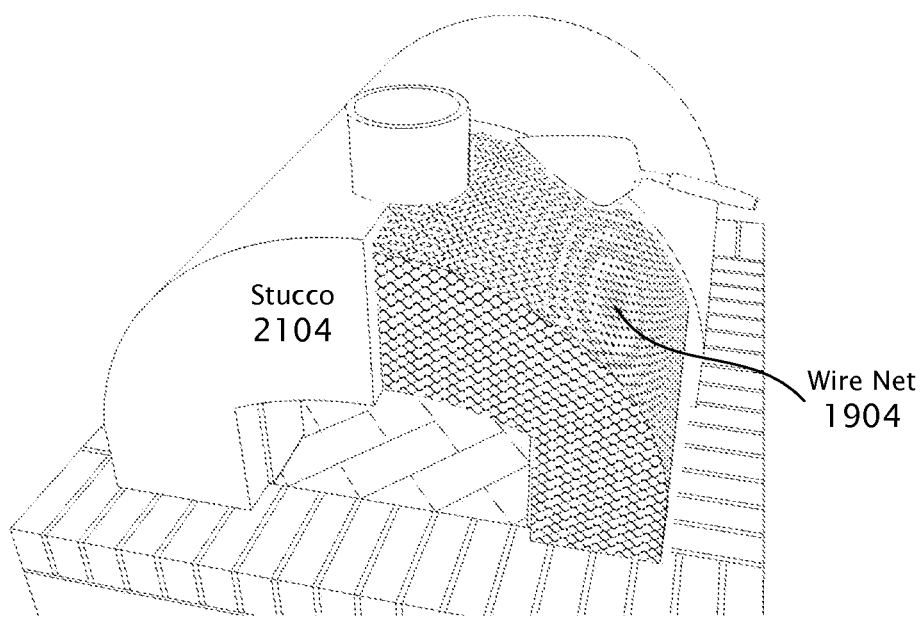
FIG. 21 shows application of stucco over the wire netting and the oven with the finished stucco coating.

FIG. 21 shows application of stucco over the wire netting and the oven with the finished stucco coating 2102. Typically a half inch of stucco 2104 is troweled over the wire mesh or net 1904. Typically a second layer of stucco is applied after the first cures. At this time the cap (not shown) may be placed on the chimney, and other optional finishing effects, such as stone veneer, may be applied.

Figure 22:
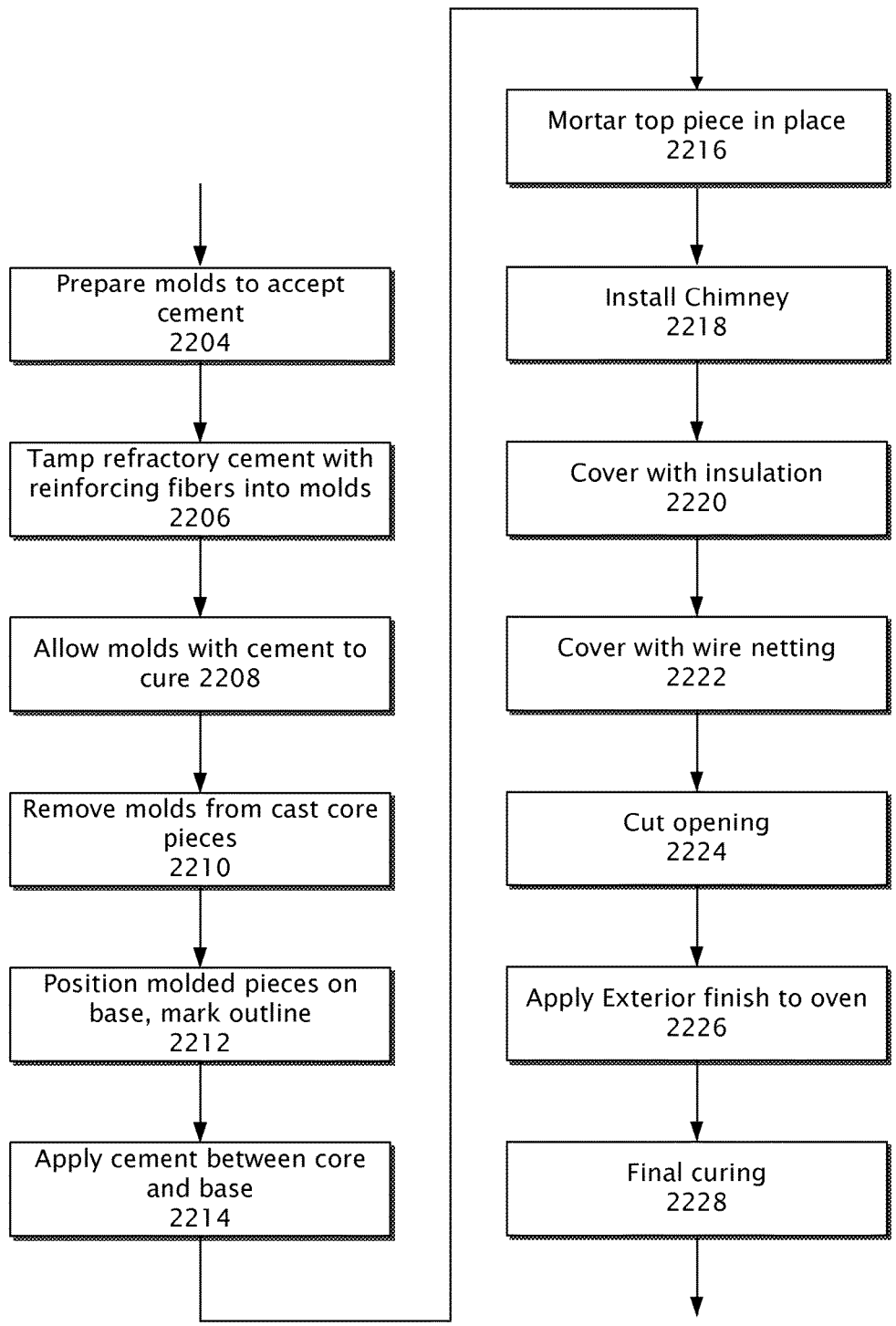
FIG. 22 is a flow chart showing the process of oven construction.

FIG. 22 is a flow chart showing the process of oven construction. The process is a summary of that previously illustrated in FIGS. 7-21. At block 2204 the molds are prepared to accept cement-typically by wetting. At block 2206 refractory cement that has been previously mixed with reinforcing steel fibers is disposed and tamped into the molds. At block 2208 the cement is allowed to cure. At block 2210 the molds are removed from the oven core pieces, and the pieces may be cleaned. At block 2212 the mold pieces are positioned on the pedestal, and their outline marked. At block 2214 mortar is applied between the panels and base, to seal against drafts as the pieces contacting the base are assembled. At block 2216 the remaining ledges of the molded pieces are mortared, and the top piece is installed. At block 2218 the chimney is installed and the seams in the oven core get an additional coating of mortar. At block 2220 the core is wrapped with insulation. At block 2222 the insulation is covered with wire netting. At block 2224 the insulation and wire netting covering the oven opening is removed. At block 2226 final finishing of stucco brick and the like is applied. At block 2228 final curing is allowed, until the oven is ready to be fired and used for cooking.

FIGS. 23-31 show various views of a design of pizza oven core.

Figure 23:
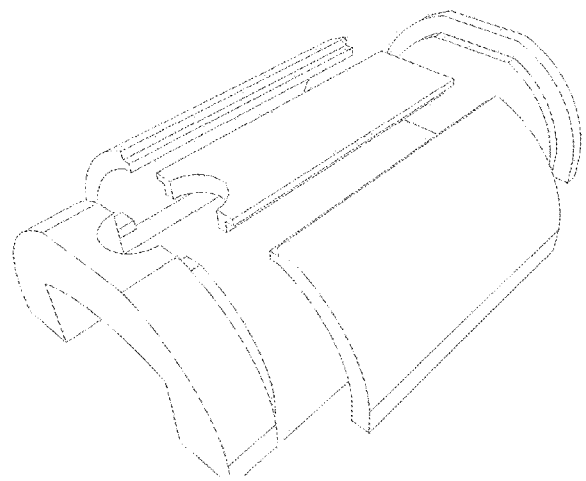
FIGS. 23-31 show various views of a design of pizza oven core.

FIG. 23 is a front perspective exploded view of a pizza oven core.

Figure 24:
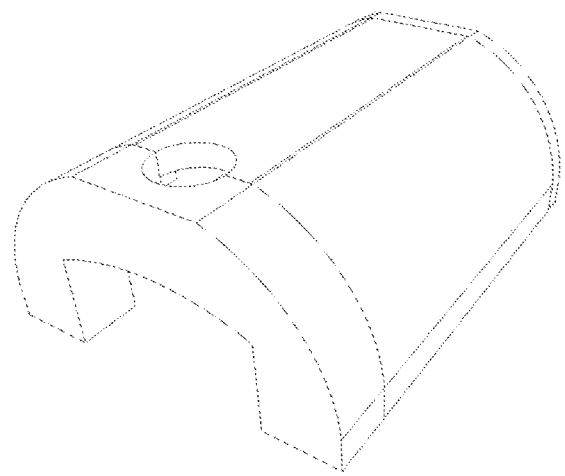

FIG. 24 is a front perspective view of a pizza oven core.

Figure 25:
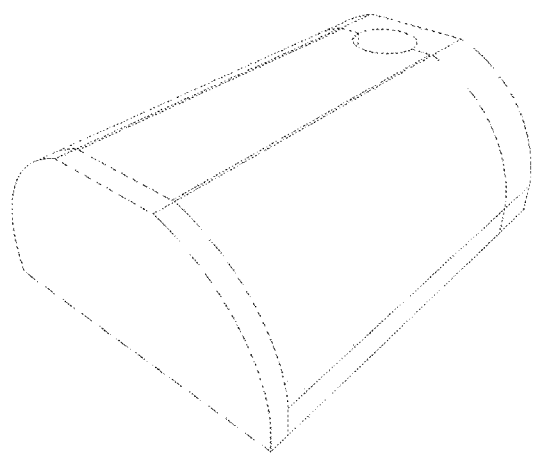

FIG. 25 is a rear perspective view of a pizza oven core.

Figure 26:
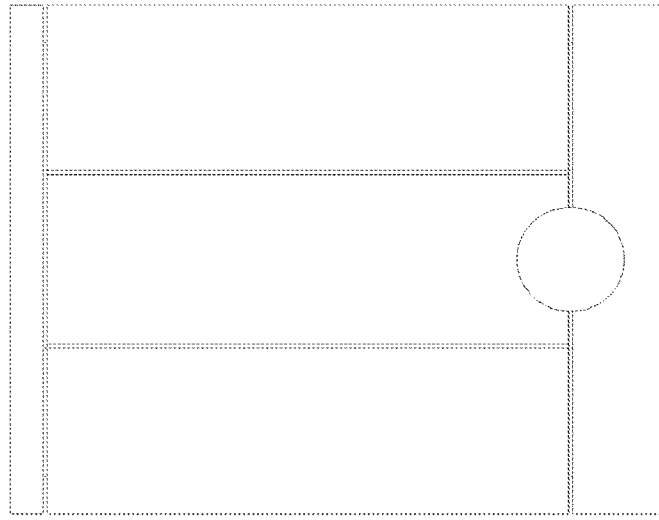

FIG. 26 is a top view of a pizza oven core.

Figure 27:

FIG. 27 is a right view of a pizza oven core.

Figure 28:
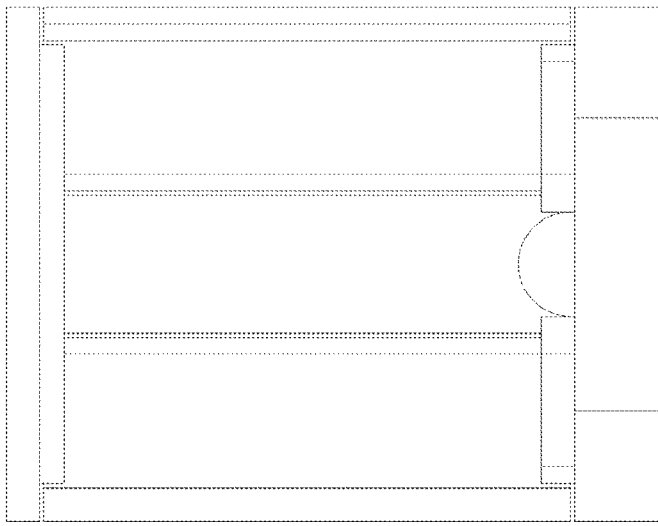

FIG. 28 is a bottom view of a pizza oven core

Figure 29:

FIG. 29 is a left view of a pizza oven core.

Figure 30:
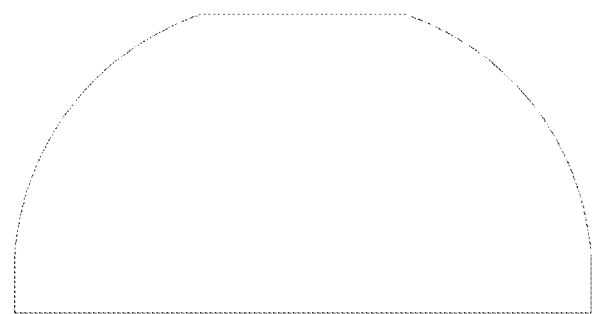

FIG. 30 is a rear view of a pizza oven core.

Figure 31:
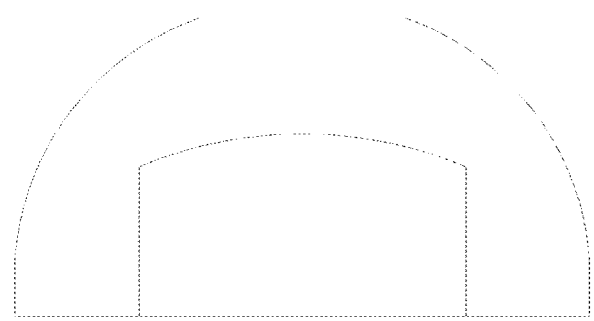

FIG. 31 is a front view of a pizza oven core.

FIGS. 32-39 show various views of a design of a finished pizza oven utilizing the previously described pizza oven core.

Figure 32:
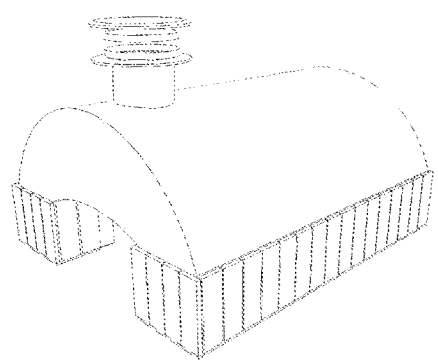
FIGS. 32-39 show various views of a design of a finished pizza oven utilizing the previously described pizza oven core.

FIG. 32 is a front perspective view of a finished pizza oven utilizing the previously described pizza oven core.

Figure 33:
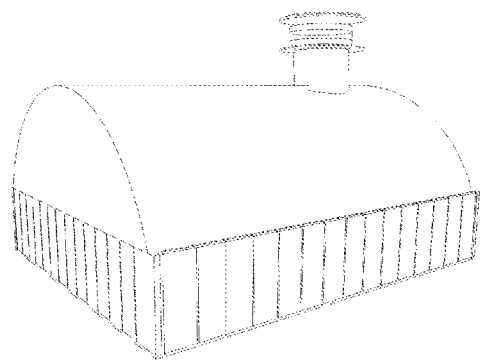

FIG. 33 is a rear perspective view of a finished pizza oven utilizing the previously described pizza oven core.

Figure 34:
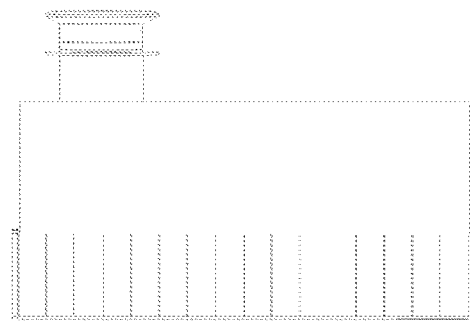

FIG. 34 is a right view of a finished pizza oven utilizing the previously described pizza oven core.

Figure 35:
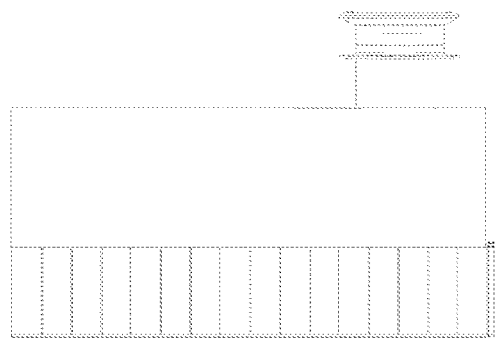

FIG. 35 is a left view of a finished pizza oven utilizing the previously described pizza oven core.

Figure 36:
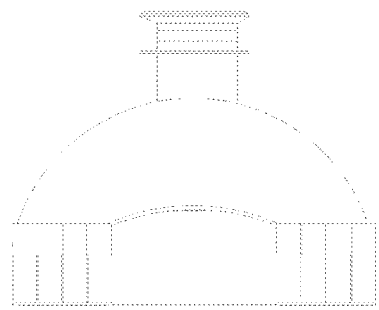
Figure 37:
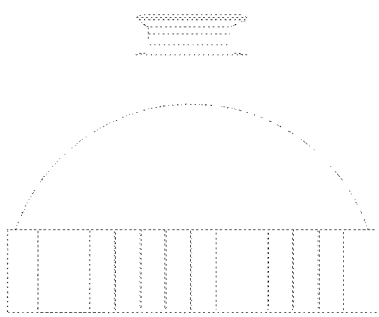

FIG. 36 is a front view of a finished pizza oven utilizing the previously described pizza oven core FIG. 37 is a rear view of a finished pizza oven utilizing the previously described pizza oven core.

Figure 38:
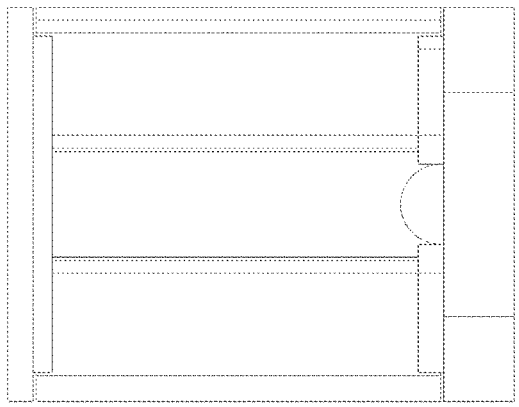

FIG. 38 is a bottom view of a finished pizza oven utilizing the previously described pizza oven core.

Figure 39:
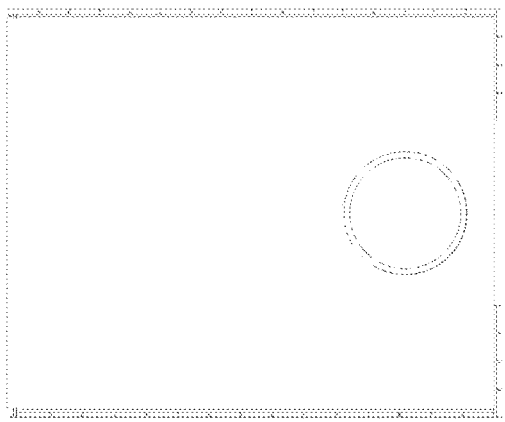

FIG. 39 is a top view of a finished pizza oven utilizing the previously described pizza oven core.

In FIGS. 23-39 any broken lines present are indicative of environmental structure in the drawing and are not part of the design sought to be patented.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A masonry pizza oven form set comprising;
a mold for forming a front wall section including:
 a first bottom spacer sheet;
 a ledge sheet attached to the first spacer sheet and having an end shaped aperture disposed therein
 a front sheet attached to the ledge sheet and having an aperture disposed therein of the same shape as the end shaped aperture but reduced in scale;
a mold for forming a front wall section including:
 a second spacer sheet;
 a ledge forming sheet having at least one ledge shaped aperture disposed therein, and attached to the seconds spacer sheet;

an oven door forming sheet having an foam shape disposed in an aperture disposed in the oven door forming sheet in the shape of an oven door, and a second foam shape disposed between a top of the oven door shape to form a partial chimney opening; and a mold for forming a top panel and a pair of side panels including:

a rectangular prism shaped section having formed along a long axis of the prism an aperture of the same cross sectional shape of a top panel, and a pair of apertures of the same cross sectional shape as side panels; and a bottom piece attached to an end of the rectangular prism to form a bottom of the mold.

2. The masonry pizza oven form set of claim 1, in which the mold material is closed cell foam.

3. The masonry pizza oven form set of claim 1, in which the length of the rectangular prism shaped section is substantially the length of a finished oven.

4. The masonry pizza oven form set of claim 1, in which the end shaped aperture is substantially the shape of a semicircle.

\* \* \* \* \*